United States Patent Office 2,867,805
Patented Jan. 6, 1959

2,867,805

PROCESS FOR THE ELIMINATION OF THE UN-CONVERTED POLYMER-FORMING MONOMERS FROM SYNTHETIC LINEAR POLYAMIDES

Hermann Ludewig, Rudolstadt, Thuringia, Germany, assignor to VEB Thuringisches Kunstfaserwerk "Wilhelm Pieck" Schwarza, Rudolstadt, Germany No Drawing. Application March 1, 1954
Serial No. 413,427

Claims priority, application Germany July 25, 1953

7 Claims. (Cl. 260—78)

This invention relates to a process for eliminating the unconverted monomers remaining in synthetic linear high polymers after their condensation or polymerisation.

On preparing linear high polymers of technical importance, viz. polyamides, polyesters and the like, a certain excess of polymer-forming monomers will remain in the resulting products and tend to interfere with subsequent working up of the condensation or polymerisation products. On condensing 6-amino-hexane-acid or caprolactam, for instance, 10–11% water-soluble low-polymeric portions remain; and on condensing esters of terephthalic acid with ethylene glycol an excess of glycol is formed the removal of which is rather difficult.

Hitherto the excess low-molecular lactam has been eliminated by extracting the cooled and broken polyamide mass with water. This method is rather disadvantageous, for the extracted polymerisation product has to be subjected to an elaborate drying process which brings about a falling off in quality of the chips because of superficial oxidation; moreover large amounts of water have to be evaporated in order to recover the lactam.

It has been found, in accordance with the present invention, that the existing difficulties and the additional extraction of polyamides may be avoided by blowing a strong current of superheated steam through the polymeric melt, prepared as usual and containing residual monomers. As a result of this process both the monomeric constituents and any water still present in the melt are entrained with the steam and thus completely removed from the melt.

According to this invention the steam treatment may be carried out immediately after completion of the polymerisation or condensation. However, the steam treatment must not begin prematurely, otherwise those components which are necessary for the formation of polymers might also be removed and the desired high polymeric state might not be reached. It is also possible to subject the chips, prepared in any known manner, to the steam treatment after remelting them before spinning. Before being spun the melt is led through a calming and degassing zone in which it is allowed to quiesce and is freed from most of the residual steam bubbles. This zone must be sufficiently large to achieve quiescence; on the other hand it must not be too extended as otherwise monomeric constituents may be reformed. In general, the melt should not remain in the degassing zone any longer than 15–30 min.

The process of the present invention is applicable with particular advantage to the simplified continuous process (VK-process) for the production and spinning of polyamides from caprolactam, by first polymerising in one stage, then blowing the current of steam through the polymerised melt and finally spinning the melt after degassing it. By using the steam treatment it is possible to spin the formed polyamide into continuous filaments immediately after its polymerisation or condensation, so that the manufacture of silk will be simpler and cheaper. Up to now the spinning of silk from polyamides on an industrial scale was not carried out continuously, because the above described extraction of the polyamide chips could not be dispensed with.

The time required for the steam treatment depends on the amount of steam which is blown through the melt. It must not be too short; the period suitable for this purpose is best ascertained by experiment. To attain the effect necessary for the accomplishment of the process of this invention the current must be blown vigorously through the melt. It does not matter whether the steam is blown through the melt continuously or intermittently. The elimination of excess monomeric compounds can be speeded up by carrying out the process of the invention while the melt is under vacuum. The temperature of the steam used for this process must be sufficiently high to prevent the melt from solidifying. It is preferable to heat it to 200–300°. Having passed through the melt the steam containing the monomeric compounds may be recovered by condensation and freed from the monomers.

To achieve this the steam is circulated in a closed conduit. After having been blown through the melt the superheated steam passes through a cooler back to the vessel in which the steam is produced. While the resulting water is evaporated off again and the steam is blown through the melt, the monomeric compounds accumulate in the vessel. Thereupon they may easily be recovered by any known process.

A process of melting and spinning polymerisation products in the presence of a constant steam pressure has been described for the purpose of obtaining products with a constant amount of moisture in order to avoid depolymerisation of the polymer at the spinning temperature. The excess of monomeric compounds is not removed by this process. In the process of the present invention it is necessary to blow the superheated steam current vigorously through the melt as is described above. The present process does not leave constant amounts of moisture in the melt; it is, on the contrary, substantially completely freed from all monomeric compounds, water included.

The following examples illustrate the present invention and demonstrate the advantage thereof:

Example 1

11.3 kg. of caprolactam (100 mol), 1 l. of water and 30 g. of glacial acetic acid (½ mol) are heated for an hour in the absence of air in an autoclave which is equipped with a stirrer and heated by means of diphenyl. The pressure present in the autoclave is maintained at 10 atmospheres by permitting steam to escape. The steam is then blown off completely, and immediately or after the melt has been standing for several hours at a temperature of 260° a strong current of steam heated at 270–280° is blown through the condensed melt, which is vigorously stirred. This operation takes 3–4 hours. The melt is thereafter transferred to a small vessel arranged above the spinning apparatus in which it is left for 10–30 min. in order to reach quiescence and to be degassed. From there it is then continuously spun into filaments, bristles or bibbons in the usual way. The high polymer product has a viscosity of $\eta_{rel}=2.15$ (determined in 1 vol. percent concentrated $H_2SO_4$) and contains a residue of only 3.5% water-soluble compounds. 7% of monomeric and dimeric lactam have been removed by the steam treatment.

Example 2

Polyamide chips prepared in the usual way by polymerising caprolactam in an autoclave or in a VK-tube are melted on the grid without being previously extracted. Below the heated grid tubes coming from outside are arranged carrying steam which is heated at 260–280° and continuously blown into the melt. Hereafter the melt passes a degassing zone and is then transferred to the spinning pumps without the blowing process being interrupted. The filaments have just the same content of water-soluble compounds as those which are produced from extracted chips according to the usual grid-spinning process without using steam.

*Example 3*

A polyamide prepared by condensing adipic acid and hexamethylene diamine with addition of 10–20% caprolactam is formed into a ribbon, which is not broken into chips but melted in the usual way for ribbons. A strong current of steam is then blown through the melt for one hour. The spinning properties of the melt treated as indicated correspond to those of the melt prepared in accordance with Example 2.

*Example 4*

A polymeric melt prepared by the simplified continuous process (VK-process) from caprolactam with addition of $\frac{1}{400}$ mol of acetic acid as stabilizer is transferred to a heated vessel, the heated bottom of which is provided with fine holes through which steam heated at 270° is blown into the melt. From the melt which contains 10–11% water-soluble portions, the steam removes the 6–7% compounds which are distillable with steam. Thus, on leaving this vessel the melt having a viscosity of $\eta_{rel}=2.4$ contains no more than 3–4% compounds which are extractable with water, but not distillable with steam.

*Example 5*

By heating equal amounts of the dimethyl ester of terephthalic acid and ethylene glycol at temperatures of between 200–240° in the presence of sodium as catalyst a slightly condensed polymer is formed which still contains an excess of glycol. This glycol is removed by blowing steam through the molten polymer. Its viscosity is increased and the polyester obtained can be transformed into filaments.

*Example 6*

The caprolactam of amino-caproic acid with addition of 3% water and $\frac{1}{400}$ mol of acetic acid, referred to caprolactam, is condensed by the usual continuous process yielding a polymeric melt which contains 10–11% water-soluble monomeric and low-polymeric portions. The melt is transferred to a vessel heated at 260–280° which is provided with a device similar to a sparger from which steam heated at 280° blows into the melt. The steam is produced in a vessel which is heated electrically or by gas; from there the steam passes through a superheater, i. e. an insulated tube provided with a heating element, to the sparger which is arranged in the melt. The steam drives the lactam and the so-called di-lactam out of the melt. The melt is continuously treated with steam for about one hour. The melt is thereupon transferred to a small vessel above the spinning apparatus. In this vessel the melt is allowed to quiesce and degassed, i. e. freed from steam bubbles. From there it is then continuously spun into filaments. The degassing zone, in which the melt is left for 10–30 min., may also be arranged directly below the sparger. As it is not distillable with non-superheated steam the lactam accumulates in the steam vessel. Having attained a certain concentration (20–30%) the solution is continuously or discontinuously withdrawn, i. e. replaced by fresh water. The solution is concentrated by evaporation and caprolactam is recovered from the residue in the usual way.

*Example 7*

Chips from high polymeric caprolactam, prepared as usual in an autoclave or VK-tube are boiled with water until an extract of 0.5% is obtained. When still moist, the chips are melted on a grid. The melt prepared in this way is treated with superheated steam according to the method described in Example 4. The steam removes the lactam which is formed during the remelting of the chips. The melt yields filaments which contain only about 1% water-soluble compounds. Filaments which are spun from dried chips in the same way, but in the absence of steam, contain—according to the time during which they remain in the pool beneath the grid—2–6% water-soluble compounds which will be removed by washing.

What I claim is:

1. A process for the separation of unconverted monomer from a highly viscous melt of a polyamide containing the same, said polyamide being formed from a material selected from the class consisting of 6-aminohexanoic acid, caprolactam and a mixture of a condensation product of adipic acid and hexamethylene diamine with caprolactam, which comprises forming a highly viscous melt of said polyamide comprising substantially completely polymerized monomer and unconverted monomer, introducing a strong current of superheated steam maintained at a temperature of between 200°–300° C. into said melt, whereby said steam is caused to enter said melt and pass through it, sweeping with it unconverted monomer, separating the steam and unconverted monomer contained therein from the melt, conveying said melt substantially free of monomer to a degassing zone and allowing said melt to quiesce in said degassing zone until most of the residual steam bubbles are freed from said melt, said melt remaining in said degassing zone at most for about 30 minutes.

2. A process according to claim 1 wherein said steam treatment is effected under vacuum.

3. A process according to claim 1 wherein said polyamide is formed from the polymerization of caprolactam.

4. A process according to claim 3 wherein the polyamide melt freed of monomer is spun into a filament.

5. A process according to claim 1 wherein said polyamide is formed from the polymerization of 6-aminohexanoic acid.

6. A process according to claim 1 wherein said polyamide is formed by the polymerization of a mixture of a condensation product of adipic acid and hexamethylene diamine with caprolactam.

7. A process according to claim 1 wherein the melt employed is the hot reaction mixture obtained in the formation of the polyamide.

References Cited in the file of this patent

UNITED STATES PATENTS

| | | |
|---|---|---|
| 2,068,424 | Mark et al. | Jan. 19, 1937 |
| 2,359,212 | Frank et al. | Sept. 26, 1944 |
| 2,361,717 | Taylor | Oct. 31, 1944 |
| 2,455,225 | Burroughs | Nov. 30, 1948 |
| 2,562,797 | Koch et al. | July 31, 1951 |